United States Patent [19]

Holmes

[11] 4,131,050
[45] Dec. 26, 1978

[54] VISUAL LOAD INDICATOR

[75] Inventor: Peter C. Holmes, Gates Mills, Ohio

[73] Assignee: The Solon Manufacturing Company, Chardon, Ohio

[21] Appl. No.: 812,691

[22] Filed: Jul. 5, 1977

[51] Int. Cl.² ............................................. F16B 31/02
[52] U.S. Cl. ........................................................ 85/62
[58] Field of Search ................. 85/62; 151/38, 52, 37, 151/19 R; 73/88 F; 116/114 R

[56] References Cited

U.S. PATENT DOCUMENTS

| 3,060,731 | 10/1962 | Adise | 85/62 X |
| 3,072,093 | 1/1963 | Lanius, Jr. | 85/62 X |
| 3,104,645 | 9/1963 | Harrison | 85/62 X |
| 3,150,557 | 9/1964 | Brown | 85/62 |
| 3,161,174 | 12/1964 | Harrison | 85/62 X |
| 3,187,621 | 6/1965 | Turner | 85/62 |
| 3,474,701 | 10/1969 | Setzer | 85/62 |
| 3,736,394 | 5/1973 | Rumbaugh | 85/62 X |
| 3,802,379 | 4/1974 | Sandberg | 85/62 |
| 3,945,704 | 3/1976 | Kraus | 73/88 F |
| 4,020,734 | 5/1977 | Bell | 85/62 |

Primary Examiner—James T. McCall
Attorney, Agent, or Firm—Bosworth, Sessions & McCoy

[57] ABSTRACT

A load indicator is disclosed which has a spring washer portion and two levers. As the washer portion is deflected under compression, the levers deflect and amplify the deflection of different sections of the washer portion. The levers are mounted such that they deflect toward each other as the washer portion is compressed. The position of the levers is calibrated so that the tips of the levers are aligned when a predetermined load is placed on the washer portion, providing an easy and accurate visual and tactile indication of the attainment of the predetermined load level.

15 Claims, 19 Drawing Figures

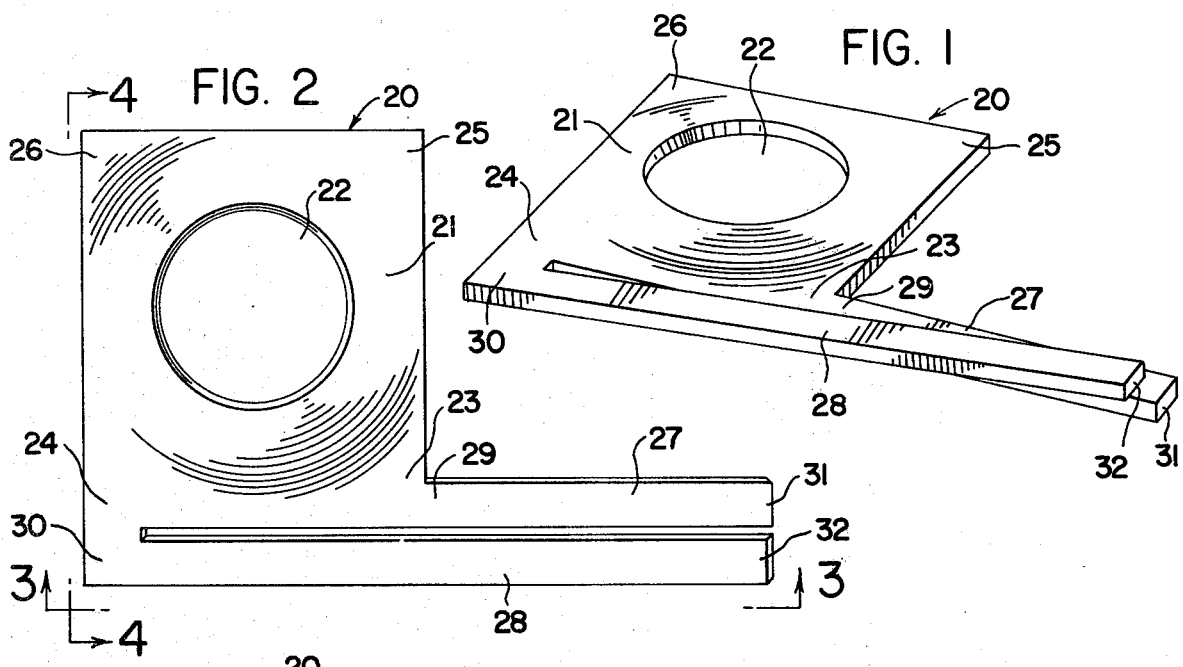
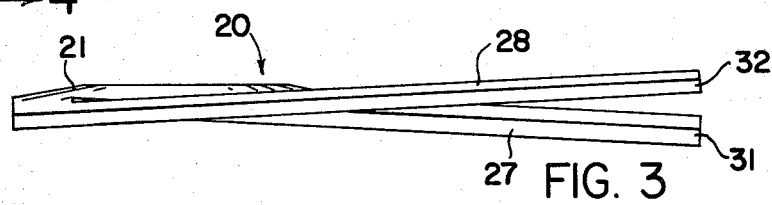
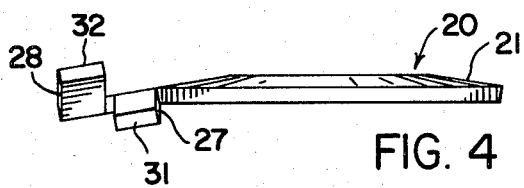
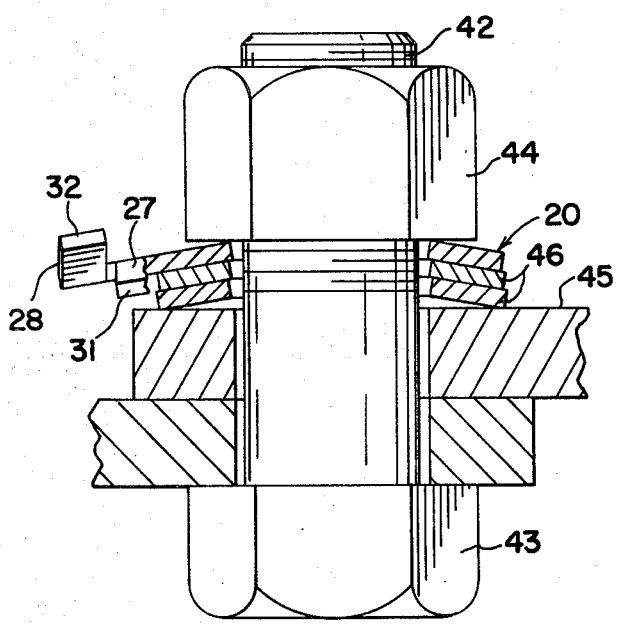
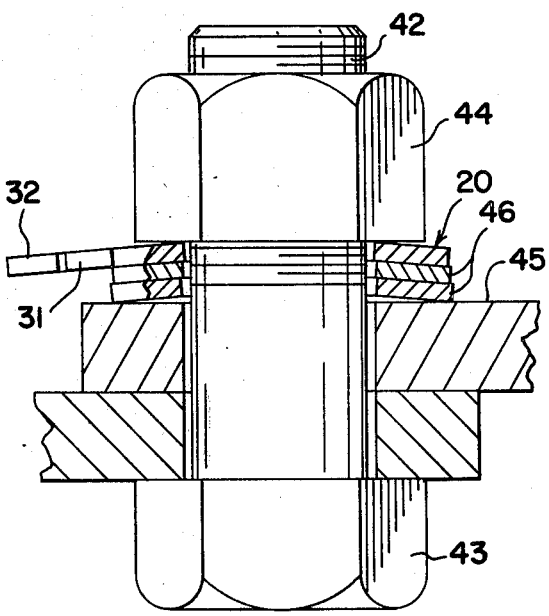

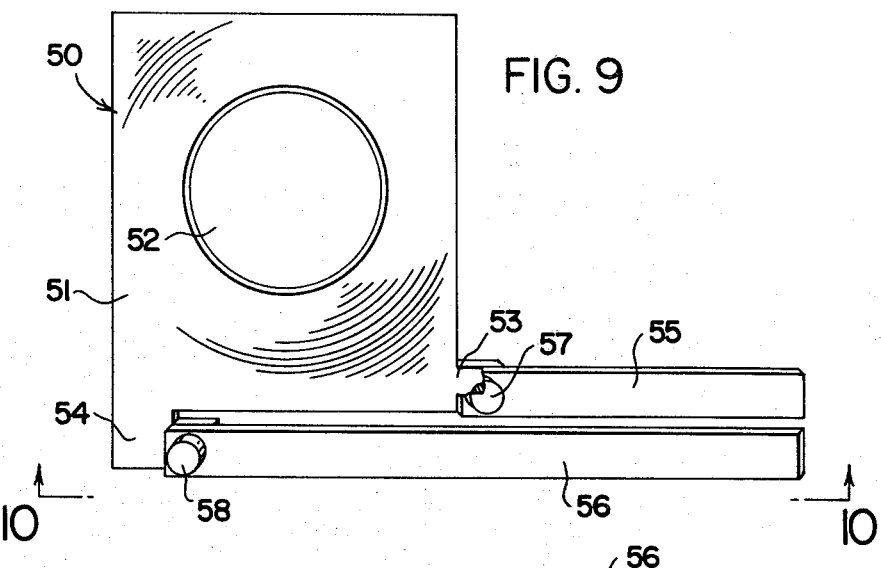
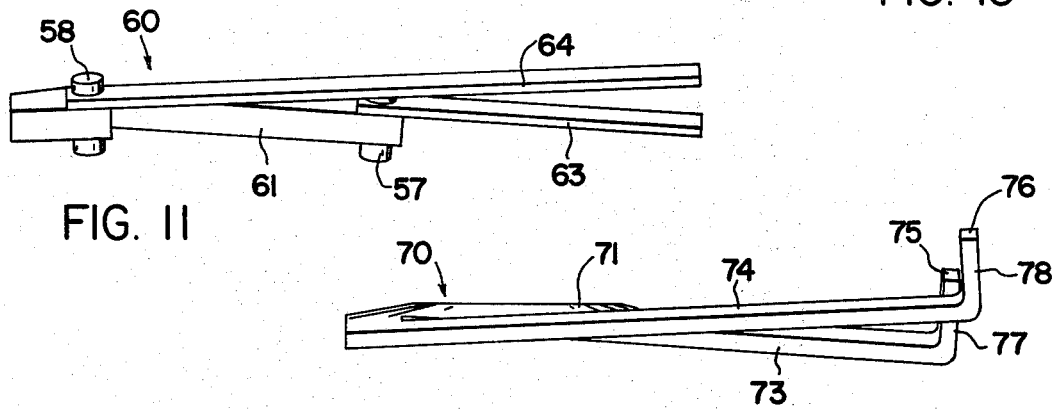
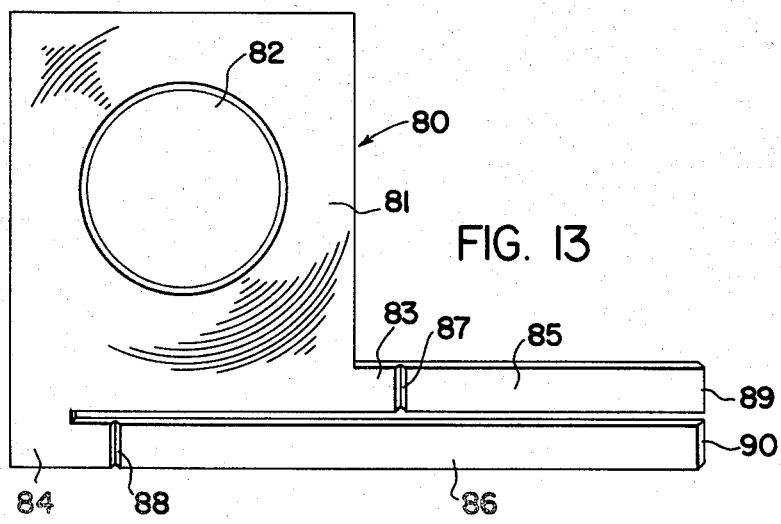

VISUAL LOAD INDICATOR

BACKGROUND OF THE INVENTION

This invention relates to means to indicate the application of predetermined stress-strain loads to driven, headed and screw-threaded fastenings. In many applications, it is desirable to accurately determine the load level being placed on a bolt, screw, nut or other fastener. Examples of such applications include refineries, chemical plants, other heavy structural work, internal combustion engine cylinder head bolts, and bolts supporting mine roofs or ceilings.

In the past, the loading on a fastener has often been measured by devices such as torque wrenches or hydraulic bolt tensioners. Other methods of tightening a bolt to a predetermined load require heating the bolt to a calculated expansion before running down the nut or tightening the bolt manually and measuring the elongation of the bolt with a micrometer. This is called heat cycling. All of these methods depend on sophisticated tools and gauges, most of which are not suitable for field use. Torque wrenches lack sufficient accuracy because the actual loading on the bolt is not necessarily that indicated by the torque wrench because of tight, rough or dirty threads, because of dirt from the flat faces subject to relative rotation in tightening the nut, because of variations in the properties of any lubricant used, and because of wide variations in the coefficient of friction in the threads.

Various other devices for indicating the loading on bolts have been suggested, which devices fit between the fastener head or nut and a bearing surface. Examples of such devices include a wedged motion translator which converts the small axial movements into a circumferential movement, increasing the circumfernce of a split ring, which increase is measurable on two attached radially extending arms (Adise U.S. Pat. No. 3,060,731); a washer which collapses or buckles when the compressive load reaches a predetermined level (Lewis U.S. Pat. No. 3,174,386); a dynomometer which converts the strain on a washer-like element into a measurable electrical resistance (Ramberg U.S. Pat. No. 2,493,029); and an assembly having cantilevered flags which project outwardly between the bolt head and the bearing surface and which are extruded by a bearing shoe and deflect downwardly when the stress on the bolt becomes excessive (Harrison U.S. Pat. No. 3,104,645).

It is also known that conical or belleville spring washers may be placed between the fastener head or nut and the bearing surface and that the compressive deflection of such washers from their normal conical shape to a substantially flat state varies in an approximate direct relation to the load being placed upon the fastener (Knocke U.S. Pat. No. 2,781,687 and Ralston U.S. Pat. No. 2,850,937). However, the amount of the deflection of such washers is very small even with large compressive loads. To accurately determine the proper load on the fastener, the deflection of the washer must be accurately measured, for example, as within 0.001 inches. Such accurate measurement requires special tools which are not adaptable for field use.

Various devices have been suggested for use in conjunction with belleville or conical spring washers to assist in the measurement of the compressive deflection of such washers. Most of these devices include a triggering mechanism which is activated when a predetermined compressive load has been placed on the washer (Setzler U.S. Pat. No. 3,474,701; Rumbough U.S. Pat. No. 3,736,394; Curtis U.S. Pat. No. 3,881,392). With each of these devices the manufacturing costs are generally high, the device may not be reusable, the visual indications are relatively small, and the accuracy of the device is limited by the action of the triggering mechanism so that the device is not necessarily as accurate as the measured deflection of the spring washer.

SUMMARY OF THE INVENTION

The present invention overcomes the problems of prior art load indicators by providing a device which provides an easy visual and tactile indication of a predetermined load level on a fastening, while attaining the same load indicating accuracy as a precise measurement of the deflection of a conical washer. Unlike the complicated mechanisms of the prior art, the present device is of a single-piece design which is reusable, relatively simple, and inexpensive to manufacture. The load indicator of the present invention provides an accurate visual indication of the bolt load level regardless of the condition of the bolt thread, or of method of bolting and without the necessity of special tools or gauges.

The load indicator of the present invention comprises a spring washer portion and two attached levers. The levers amplify or magnify the deflection of the washer portion under compressive loading so that this deflection can be easily and accurately detected. The levers are attached to the washer portion so that the levers are deflected toward each other as the washer portion is compressed. The load indicator is pre-calibrated by setting or bending the levers so that the ends of both levers are aligned upon the attainment of a predetermined load level.

BRIEF DESCRIPTION OF THE DRAWINGS

FIG. 1 is a perspective view of the load indicator of the present invention.

FIG. 2 is a top plan view of the load indicator of FIG. 1.

FIG. 3 is a front elevational view of the load indicator taken along line 3—3 of FIG. 2.

FIG. 4 is a side elevational view of the load indicator taken along line 4—4 of FIG. 2.

FIG. 5 is a bolt assembly having a load indicator of the present invention and two belleville washers in parallel before loading has been applied to the bolt.

FIG. 6 is another view of the bolt assembly of FIG. 5 after loading has been applied.

FIG. 9 is a top plan view of another embodiment of the present invention in which the levers of the load indicator are riveted to the washer portion.

FIG. 10 is a front elevational view of the load indicator taken along line 10—10 of FIG. 9.

FIG. 11 is a front elevational view of another load indicator similar to FIG. 10 but having thinner levers and a thicker washer portion for greater loads.

FIG. 12 is a front elevational view of another embodiment in which the levers of the load indicator have flanges at their tips to aid in visual indication of predetermined loading.

FIG. 13 is a top plan view of another embodiment of the load indicator of the present invention having removable levers.

DESCRIPTION OF THE PREFERRED EMBODIMENTS

Figure 7:
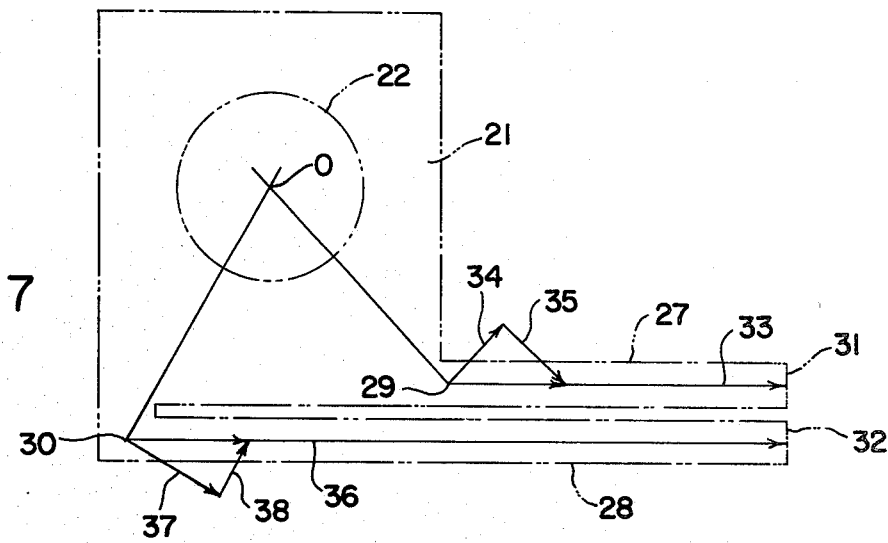
FIG. 7 is a diagrammatic view in a polar coordinate system illustrating the preferred attachment of the levers to the washer portion.

Referring to the drawings in detail and initially to FIGS. 1–4, there is shown in its preferred form a load indicator 20 of the present invention. The load indicator 20 comprises a washer portion 21 having a central hole 22 for the shank of a fastener. The washer portion 21 is dished or frustoconical in shape similar to known spring washers of the conical or belleville type and is adapted to be compressed when subjected to a compressive force. As shown, the washer portion 21 is square with corners or projecting tabs 23, 24, 25 and 26. The washer portion may also be rectangular, multi-cornered or round. The central hole 22 should be at least 0.005 inches larger in diameter than the diameter of the shank of the fastener. The material of the washer portion 21 should be substantially within yield strength for the required deflection so that the load indicator will have the strength to support the required deflection and follow the movement of load supporting washers without yielding. It is preferred that the width of the washer portion 21, or the diameter of a round washer portion, should be 1.25 to 6 times the bolt diameter. In most applications, the size of the washer portion 21 is limited by the allowable space. The thickness of the material of the washer portion 21 should not be thinner than the thread pitch of the fastener; for example, for a bolt having a pitch of 8 threads per inch, the thickness of the washer portion should not be less than 0.125 inches.

The actual load on the washer portion 21 is indicated by a pair of levers 27 and 28 which are attached to the washer portion. The first lever 27 is attached to the washer portion 21 at an attachment point 29 on the tab. The second lever 28 is attached to the washer portion 21 at a second attachment point 30. In the preferred form of the present invention, the attachment points 29 and 30 are at the corners 23 and 24 of the square washer portion 21. It is to be understood that if the washer portion 21 is round, tabs could project from the periphery of the washer portion for lever attachment. It is also to be understood that with square or rectangular washer portions, the corners 25 and 26 not used as attachment points can be rounded. The purpose of the levers 27 and 28 is to follow the deflection of the washer portion 21 from its normal conical shape to its compressive shape, and to magnify or amplify this deflection so that it is readily indicated both visually and tactilely. This is accomplished by attaching the levers 27 and 28 to the washer portion 21 such that the free ends of the levers move toward each other as the washer portion is compressively deflected. The load indicator 20 is precalibrated by bending or adjusting the position of the levers 27 and 28, so that when the predetermined compressive load is placed on the indicator and the washer portion 21 has been deflected the proper amount, the free ends 31 and 32 of the levers are aligned, providing a convenient and accurate visual and tactile indication of the attainment of the predetermined load.

In the preferred form of the present invention in which the washer portion 21 comprises a conical or belleville type washer, the levers 27 and 28 are attached to the washer portion so that one lever magnifies the deflection of the washer in the radially outward direction while the other lever amplifies the deflection of the washer in the opposite or radially inward direction. Specifically, the first lever 27 extends from its attachment point 29 in a direction having a radially outward component, and the second lever 28 extends from its attachment point 30 in a direction having a radially inward component.

These different components of direction of the levers 27 and 28 can be seen in FIG. 7 in which the preferred load indicator 20 is depicted in a polar coordinate system with the origin 0 at the center of the hole 22. The first lever 27 extends from its attachment point in a direction having a vector 33. In the polar coordinate system, directional vector 33 has a tangential component 34 and a radial component 35. The second lever 28 extends from its attachment point 30 in a direction having a vector 36 which has a tangential component 37 and a radial component 38. The significance of this design is that the first lever 27 has a radial directional component 35 which extends outwardly away from the center 0 while the second lever 28 has a radial directional component 38 which extends inwardly toward the center 0.

Figure 8A:
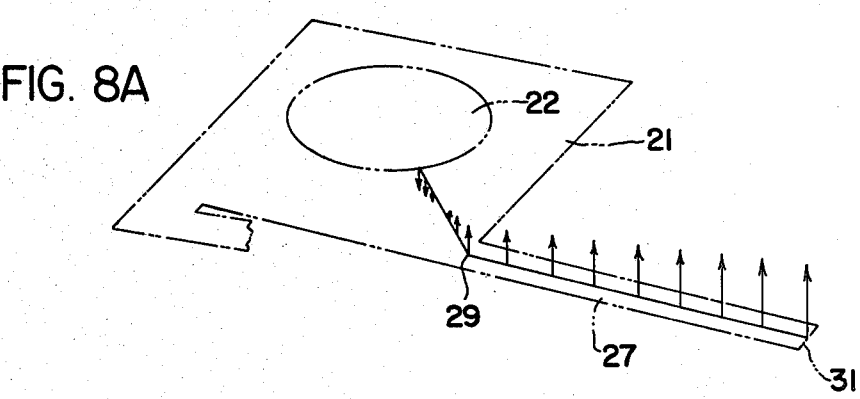
FIGS. 8A and 8B are diagrammatic views illustrating the deflection of the levers as the washer portion is compressed.
Figure 8B:
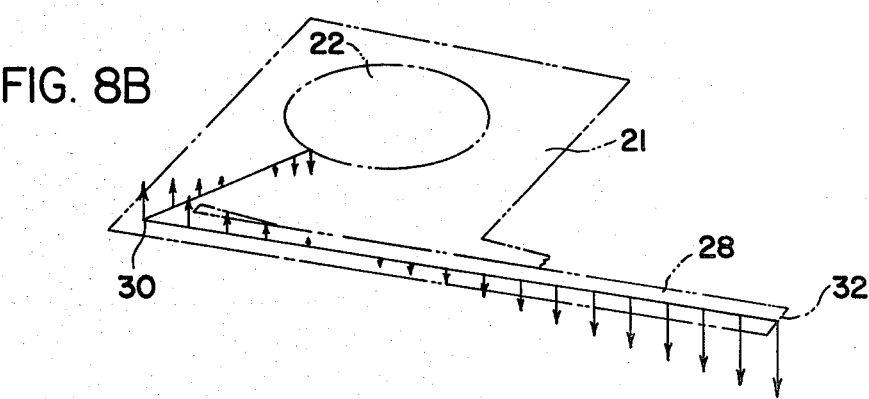

Because of these different radial components of direction, the two levers deflect toward each other as the washer portion is compressed. When the conical washer portion 21 is compressively deflected, the inner central portions of the washer adjacent to the center hole 22 are deflected downwardly while the outer periphery portions of the conical washer near the attachment points 29 and 30 are deflected upwardly relative thereto. Because the first lever 27 has a radially outward directional component 35, the free end 31 of the first lever 27 moves upwardly in relation to the upward movement of the outer periphery portion of the washer relative to the central portion (FIG. 8A). Simultaneously, because the second lever 28 has a radially inward directional component 38, the free end 32 of the second lever 28 moves downwardly in relation to the downward movement of the central portions of the washer relative to the outer periphery portions (FIG. 8B).

The movement of the levers during compressive loading of the washer portion can be seen in FIGS. 5 and 6, in which the load indicator 20 is positioned on the shank 42 of a bolt 43 between a nut 44 and a bearing surface 45. The load indicator 20 can be used in combination with one or more load-bearing belleville or conical spring washers 46 if the load indicator 20 cannot support the required load. Instead, the washer portion 21 of the indicator 20 is intended to follow the deflection of the load bearing washers 46 as the nut 44 is tightened. As shown in FIG. 6, as the nut 44 is tightened, the washers 46 and the load indicator 20 are compressed. The resulting deflection of the washer portion 21 of the load indicator 20 produces the relative movement of the levers 27 and 28. The load indicator 20 is pre-calibrated and the position of the levers adjusted so that the free ends 31 and 32 of the levers will be aligned, as shown, when the predetermined compressive load has been reached.

Preferably the length of the second lever 28 should be from 1 to 10 times the width of the washer portion 21 (or the diameter of the washer portion, if round). In most applications, the length of the levers is limited by the allowable space or the degree of accuracy required. The accuracy of the load indicator increases with the length of the levers.

The free ends 31 and 32 may be modified in cross section to aid visual calibration, for example, by chamfering to a thinner horizontal section or by painting the tip ends with a highly visible color. Instead of chamfering, a thin, contrasting color line can be painted across the tips or a thin groove may be formed in the end of the tips in the same general plane as the washer.

While the levers 27 and 28 shown in FIGS. 1-4 are integral with the washer portion 21, the levers may also be formed separately and joined to the washer portion by a threaded fastener or rivet, or by spot or butt welding or brazing. As shown in FIGS. 9 and 10, a load indicator 50 has a generally square washer portion 51 with a central hole 52 for the fastener shank. The washer portion 51 has two projecting tabs 53 and 54 for the attachment of the levers 55 and 56. The levers 55 and 56 are attached to the tabs 53 and 54 by rivets 57 and 58. As shown, the levers 55 and 56 are attached to the top of the tabs 53 and 54, but the levers can be attached to the bottom side of the washer tabs, or one lever can be attached to the top of the tab and the other lever to the bottom of the tab. The advantage of these separate, riveted levers is that they generally are easier and more economical to make.

The thickness of the washer portion of the load indicator depends upon the amount of load to be measured and supported. For a greater load level, a thicker washer portion is required. The thickness and shape of the levers, however, are not critical, except that the levers must have enough strength to resist bending during shipment and rough handling during installation. In FIG. 11, a load indicator 60 is shown which is similar to the load indicator 50 of FIG. 10, except that its washer portion 61 is much thicker in order to support higher load levels. The load indicator 60 also has thinner levers 63 and 64.

While the load indicator has been shown with the levers extending horizontally, the load indicator is not dependent upon gravity and the levers may be oriented in any direction.

For applications in which the load indicator must be viewed along the axis of the fastener shank, a load indicator 70, as shown in FIG. 12, with a washer portion 71, can be provided with levers 73 and 74 having free ends 75 and 76 which extend upwardly to form flanges 77 and 78. When the load indicator 70 is subjected to the predetermined compressive load for which it is calibrated, and the free ends 75 and 76 of the levers become aligned, the upwardly extending flanges 77 and 78 aid in determining that the load indicator is indicating the predetermined load level, when viewed downwardly from above the load indicator.

In certain applications, the levers of the load indicator may interfere with adjacent equipment because they extend too far from the attachment to the washer portion. To alleviate this problem, the load indicator may be provided with levers having a section which is weakened to permit the levers to be broken off and removed from the washer portion when they are no longer needed. As shown in FIG. 13, a load indicator 80 has a washer portion 81 with a central hole 82 and projecting tabs 83 and 84 to which levers 85 and 86 are removably attached. This removability of the levers 85 and 86 can be accomplished by the provision of scored portions 87 and 88 near the attachment of the levers 85 and 86 to the projecting tabs 83 and 84 of the washer portion 81. The removability of the levers can also be accomplished by other methods of altering the cross section of the lever or weakening the attachment point. After the proper load has been applied to the bolt as evidenced by the load indicator, and the free ends 89 and 90 of the levers 85 and 86 become aligned indicating the achievement of the predetermined load, the levers can be struck with a wrench or hammer, loosening and breaking the levers from the washer portion 81 at the scored portions 87 and 88.

Figure 14:
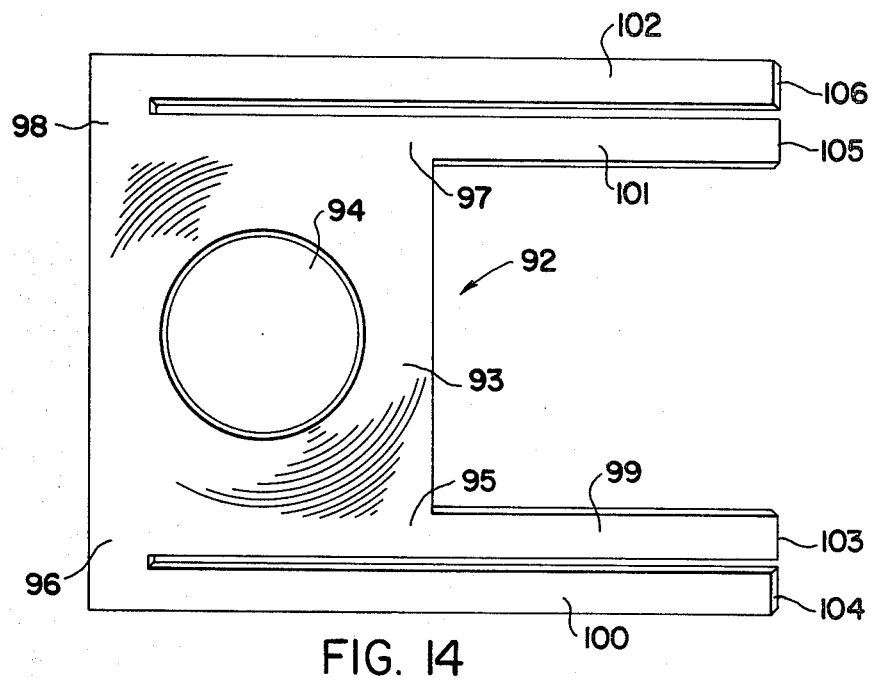
FIG. 14 is a top plan view of another embodiment of a load indicator of the present invention having two pairs of levers to indicate two different predetermined load levels.

The load indicator may also be provided with more than one pair of levers with each pair of levers calibrated to a different predetermined load level. Such a load indicator 92, shown in FIG. 14, may have a generally square or rectangular washer portion 93 with a central hole 94 and corners or projecting tabs 95, 96, 97 and 98. As with the other load indicators shown, the washer portion 93 need not be square. One pair of levers 99 and 100 are attached to tabs 95 and 96 on one side of the washer portion 93, and a second pair of levers 101 and 102 are attached to tabs 97 and 98 on the opposite side of the washer portion. While the second set of levers 101 and 102 are shown attached to tabs 97 and 98 on the opposite side of the washer portion 93 from the attachment of the first pair of levers 99 and 100, the second pair of levers can also be attached to an adjacent side of the washer portion at tabs 95 and 97 or at tabs 96 and 98. The addition of the second pair of levers permits the load indicator 92 to be used to indicate two different predetermined load levels, such as a minimum load level and a maximum load level. For instance, the first pair of levers 99 and 100 can be calibrated for a minimum load setting while the second set of levers 101 and 102 can be calibrated for a maximum load setting. In use, as the fastener is tightened, the alignment of the free ends 103 and 104 of the first pair of levers 99 and 100 will indicate to the operator when the bolt has been brought to the minimum load setting requirement. The operator can continue to tighten the fastener until alignment of the free ends 105 and 106 of the second set of levers 101 and 102 indicates that the maximum load setting has been encountered and that further tightening of the bolt should be avoided. Instead of using a special load indicator with a second pair of levers, two pairs of levers can also be provided by using two load indicators each having a single pair of levers. The two load indicators may be placed in parallel and spaced apart by a load supporting washer for a lever clearance, or they may be placed adjacent to each other with the pairs of levers on opposite or adjacent sides of the washer portions.

Figure 15:
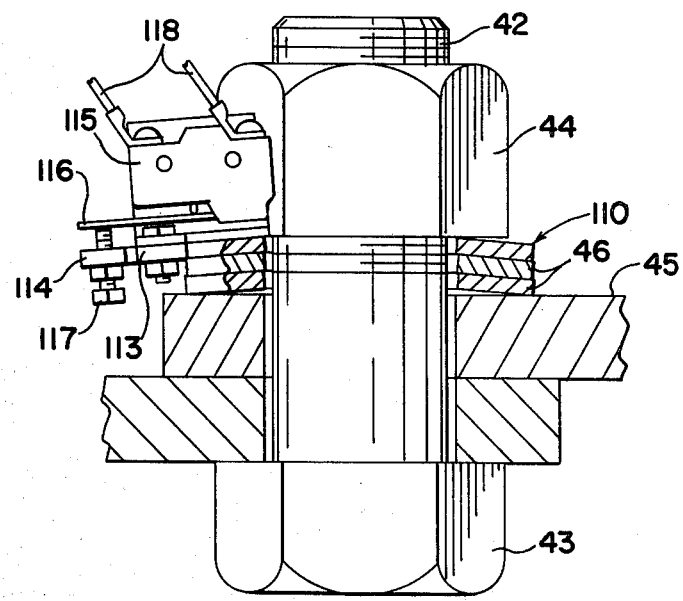
FIG. 15 is a side elevational view partially in section of a bolt assembly with a load indicator of the present invention connected to an electrical micro switch to monitor the lever movement.

While the load indicator of the present invention can be advantageously employed using visual or tactile indications of the achievement of the predetermined load level, it is also possible to combine the load indicator with electrical control means to automatically monitor the movement of the levers and the achievement of the predetermined load level. In FIG. 15, the load indicator 110 is placed over the shank 42 of the bolt 43 between the nut 44 and the bearing surface 45. The load indicator 110 is used in conjunction with one or more load bearing washers 46. As with the previously described load indicators, the load indicator 110 has a pair of levers 113 and 114. An electrical micro switch 115 which is mounted on the lever 113 has an actuating arm 116 which extends outwardly from the switch. The arm 116 is attached to the second lever 114 by suitable attachment means 117. The difference in spacing between the levers 113 and 114 results in movement of the actuating arm 116 of the micro switch 115. Thus a change in lever position away from the position indicating the predetermined load level will move the arm 116 and cause the switch 115 to open or close, which can be monitored by connecting the switch 115 to suitable control means (not shown) by wires 118. Such a load indicator 110 can be used to continuously monitor the load level. Continuous monitoring is advantageous in applications where the variation from the predetermined load level is particularly important such as in bolts supporting mine roofs or ceilings.

The load indicator of the present invention can only support light loads and should be elevated above the bearing surface by at least one load supporting washer or flat washer to provide clearance for the levers. Most loading levels exceed the load supporting limits of the washer portion of the load indicator by a substantial amount. Rather than design and make washer portions having greater thicknesses for supporting higher load levels, it is preferable to use load indicators having washer portions of standard thickness in conjunction with one or more load supporting washers capable of supporting the higher loads. The load indicator may be mounted on top of the load bearing washers or sandwiched between the load bearing washers, in parallel or in series with the load bearing washers. In such combinations, the washer portion of the load indicator responds in accordance with the total load supporting capacity of the assembly. The load indicator of the present invention is thus versatile and capable of being used in a wide range of load levels in combination with the appropriate number of load supporting washers.

When load supporting washers are used in parallel, as illustrated in FIG. 5, the load capacity of each washer is multiplied. The load capacity of two washers in parallel is twice that of one. When two load supporting washers are used in series, by which is meant with the convexities opposed to each other instead of nesting together, then the deflection is doubled while the load capacity remains that of one washer. Arranging the washers in series multiplies the deflection while arranging them in parellel multiplies the load capacity. These and other variations of these combinations are known to those skilled in the art.

In working with the load indicators of the present invention, it is important to appreciate that the levers are calibrated to indicate the predetermined load most accurately only when the fastener is tightened or brought up to the desired load. If the predetermined load is reached by loosening a fastener which has already been tightened beyond the desired load, the load indicator may not provide a sufficiently accurate reading because of the effects of static friction. If the fastener has been tightened beyond the desired load level, the assembly should be fully loosened and the process started anew.

It is thus possible to utilize the load indicator of the present invention in combination with the appropriate number and combination of load supporting washers and obtain very precise measurements of the load on fastener systems with an accuracy not possible with previous load indicators.

The following example illustrates one such application in which the present load indicator is used in conjunction with a pressure vessel having a bolted flange secured by 1¼ inch bolts. In this application, the minimum load necessary on the flange to prevent leakage past the flange gasket is 28,000 lbs. (a bolt stress of 30,000 psi). Due to heating of the pressure vessel during batch processing, the differential expansion of the flange ahead of the bolt could possibly increase the bolt load by an additional 56,000 lbs. (60,000 psi bolt stress). Since the yield point of the bolt is 97,500 lbs. (105,000 psi bolt stress), it is desirable to tighten the bolt to a load of only 32,500 lbs. (35,000 psi bolt stress) plus or minus 10 percent. This desired load would allow sufficient margin above the minimum load necessary to prevent gasket leakage and below the yield point of the bolt during the heating phase. It would be impossible for a torque wrench to achieve this load tolerance due to the wide variation in friction at the bolt threads.

The required load tolerance, however, can be achieved using the load indicator of the present invention. Using two suitable flange washers (such as Solon No. 20-F-20G Flange Washers manufactured and sold by The Solon Manufacturing Company of Chardon, Ohio) to support the 32,500 lbs. preload, and a 1¼ inch load indicator, the assembly is placed in a fixture identical with a 1¼ inch nut and bolt, and loaded to the desired 32,500 lbs. in a load simulator machine, in which the levers are bent so that the free ends are aligned. The assembly is removed from the simulator, labeled with the calibrated load, and taped or wired together to insure correct field installation. After shipment of the assembly to the installation site, the installer positions the load indicator and washer assembly, and tightens the nut on the bolt until the free ends of the levers are aligned. The load indicator of the present invention thus provides an easy and accurate visual indication of the achievement of the required load of 32,500 lbs. on the bolted flange to within a tolerance of plus or minus 10 percent.

It is expected that the resiliency of the washer portion and thus the accuracy of the load indicator will be effected by the environment to which the fastener assembly is subjected in use. For instance, the relationship between the deflection of the washer portion and the load being placed on the fastener may vary if the assembly is placed in a very cold environment in a refrigeration system, or a very hot environment in a pressure vessel. This effect, however, may be substantially eliminated or compensated for by proper selection of materials for the washer portion and by calibrating the load indicator in the same environment as its intended use.

Figure 16:
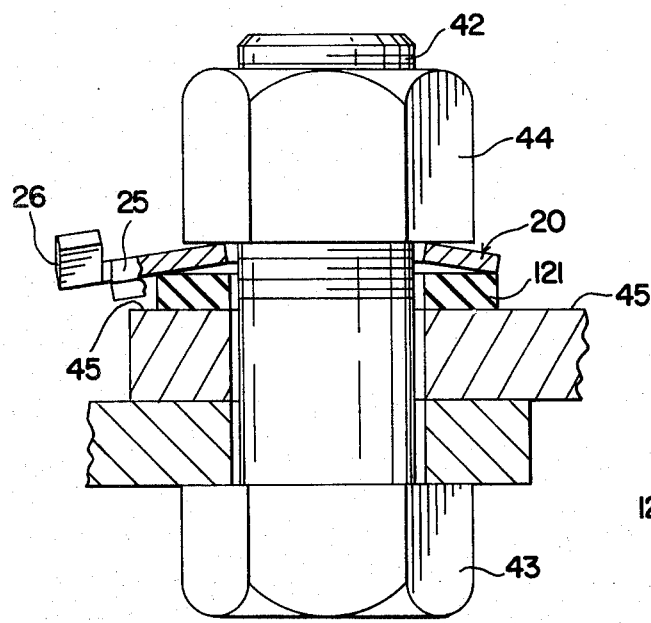
FIG. 16 is a side elevational view showing a bolt assembly with a load indicator of the present invention and a rubber washer in place of the metal belleville washers of FIG. 5.
Figure 17:
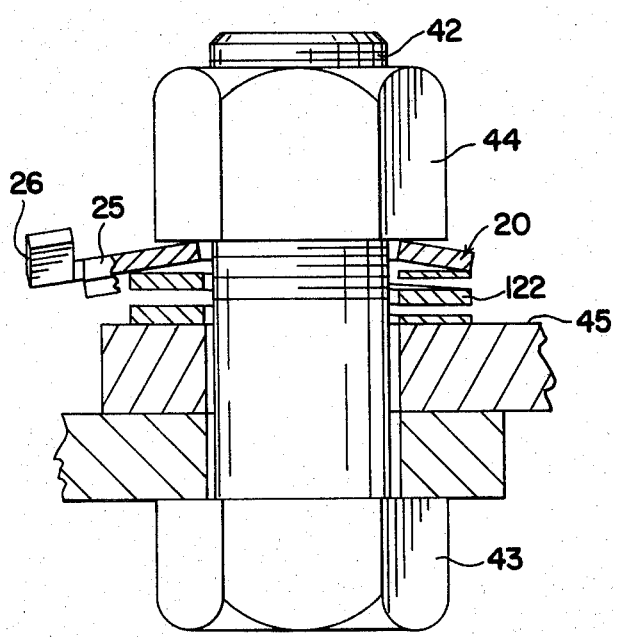
FIG. 17 is a side elevational view of another bolt assembly similar to FIG. 5 with a load indicator of the present invention and a coil spring.

It is also possible to use the load indicator of the present invention with load supporting elements other than spring washers. For example, in FIG. 16, the load indicator 20 can be used in conjunction with a rubber washer 121. In FIG. 17, a coil spring 122 can be used as the load supporting element. The load supporting element, such as the rubber washer 121 or the spring 122, should supply sufficient load supporting capability so that it can adequately sustain the required load level and should supply adequate clearance for the levers 27 and 28 of the load indicator from the bearing surface 45.

Figure 18:
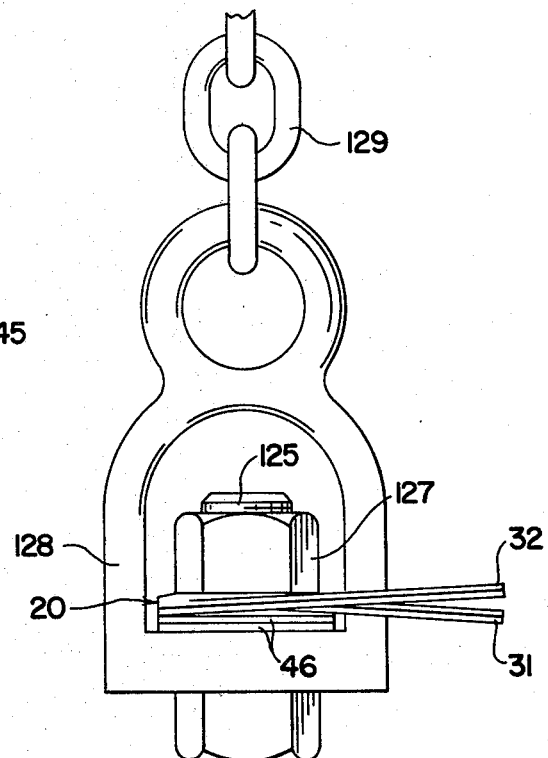
FIG. 18 is an elevational view of a chain hoist having a load indicator of the present invention.

While the load indicator of the present invention has been shown and described in conjunction with the bolts and other threaded fasteners and with the load requirements on such fasteners, it is to be understood that the load indicator may be used in a variety of applications requiring an accurate measurement of the load or stress on a shaft or shank portion. In FIG. 18, for example, the load indicator 20 is shown in a chain hoist assembly. The load indicator 20 along with the load bearing washers 46 are mounted on the shank 125 of a hoist hook 126 between a nut 127 and a supporting collar 128 mounted on the end of a chain 129. The load indicator 20 responds to the load on the hook 126 and indicated to the operator whether the maximum load supportable by the chain 129 has been encountered.

While the load indicator of the present invention has been shown using a washer portion having a dished or frustoconical shape, similar to known conical or belleville type washers, it is to be understood that other types of spring washers can be used in the washer portion of the load indicator. For example, the washer portion may be a wave spring washer, in which case, it is not necessary that the levers extend so that one lever has a radially inward component of direction from the point of attachment to the washer portion while the other lever has a radially outward component of direction from the attachment point. With a wave washer portion, the levers can be mounted so that both extend radially outwardly with one lever attached to the outer periphery of the washer portion at a point where the wave extends downwardly and the other lever attached to the washer portion at an adjacent point where the wave extends upwardly. Thus the levers will amplify and magnify the compression and deflection of the wave washer due to the compressive load and the levers will move in opposite directions, as contemplated by the present invention.

Other modifications and variations in the specific forms of the invention herein shown and described will be apparent to those skilled in the art, all within the intended scope and spirit of the invention. While the invention has been shown and described with respect to specific embodiments thereof, these are intended for the purposes of illustration rather than limitation. Accordingly, the invention is not to be limited to the specific embodiments herein shown and described, nor in any other way which is inconsistent with the extent to which the progress in the art has been advanced by this invention.

What is claimed is:

1. A load indicator which comprises:
   a single compressible spring washer portion capable of deflection when compressed;
   a first lever attached to the washer portion and axially deflected as the washer portion is compressed; and
   a second lever attached to the washer portion and axially deflected as the washer portion is compressed; the first and second levers being attached to different parts of the washer portion and being deflected toward each other when the washer portion is deflected under compression.

2. A load indicator as recited in claim 1, wherein the first and second levers are integral with the washer portion.

3. A load indicator as recited in claim 1, wherein the first and second levers are attached to the washer portion by means of a fastener.

4. A load indicator as recited in claim 1, wherein the first and second levers remain attached to the washer portion when the desired level is reached and are removable thereafter.

5. A load indicator as recited in claim 1, wherein the spring washer portion is a frustoconical belleville-type washer.

6. A load indicator which comprises:
   a single compressible spring washer portion capable of deflection when compressed;
   a first lever attached to the washer portion and axially deflected as the washer portion is compressed; and
   a second lever attached to the washer portion and axially deflected as the washer portion is compressed; the first and second levers being attached to different parts of the washer portion and being deflected toward each other when the washer portion is deflected under compression, the first and second levers being nonaligned when a compressive load of a predetermined level is not applied to the indicator, and the levers being precalibrated to be aligned when the compressive load on the indicator reaches a desired level.

7. A load indicator which comprises:
   a compressible spring washer portion;
   a first lever attached at one end to the washer portion at a first attachment point, said first lever extending from said first attachment point in a direction having a radially outward component; and
   a second lever attached at one end to the washer portion at a second attachment point, said second lever extending from said second attachment point in a direction having a radially inward component.

8. A load indicator as recited in claim 7, wherein the first and second levers are integral with the washer portion.

9. A load indicator as recited in claim 7, wherein the first and second levers are attached to the washer portion by means of a fastener.

10. A load indicator as recited in claim 7, wherein the first and second lever arms are removable.

11. A load indicator as recited in claim 7, wherein the washer portion is a frustoconical belleville-type washer.

12. A load indicator as recited in claim 7, wherein the first and second levers are nonaligned when a compressive load of a predetermined level is not applied to the indicator, and the levers are pre-calibrated to be aligned when the compressive load on the indicator reaches a desired level.

13. A load indicator as recited in claim 7, comprising in addition:
   a third lever attached at one end to the washer portion at a third attachment point, said third lever extending from said third attachment point in a direction having a radially outward component; and
   a fourth lever attached at one end to the washer portion at a fourth attachment point, the fourth lever extending from the fourth attachment point in a direction having a radially inward component.

14. A fastener assembly comprising:
   a fastener capable of being subjected to substantial loads;

spaced abutments along the fastener between which a compressive load is applied to the assembly by clamping the fastener;

a load bearing element mounted on the fastener between the abutments; and a load indicator mounted on the fastener adjacent to the load bearing element, said load indicator comprising a spring washer portion capable of deflection when subjected to the compressive load, a first lever attached to the washer portion and deflected as the washer portion is deflected by the compressive load, and a second lever attached to the washer portion and deflected as the washer portion is deflected by the compressive load, the first and second levers being deflected toward each other when the washer portion is deflected by the compressive load.

15. A load indicator made of steel which comprises:

a single substantially square frusto-conical belleville-type washer portion capable of deflection when compressed;

a first lever which is attached to one corner of the washer portion and which extends outwardly therefrom in a direction generally parallel to one side of the washer portion; and a second lever which is attached to an adjacent corner of the washer portion and which extends therefrom in a direction parallel to the first washer portion, the first and second levers being axially deflected toward one another when the washer portion is subjected to compression, the first and second levers being initially nonaligned but being precalibrated to come into alignment when the compressive load on the washer portion reaches a specified level.

* * * * *